Oct. 19, 1965        H. C. MYERS        3,212,502
KNOTLESS ADHESIVE IMPREGNATED SUTURES AND METHOD OF USE THEREOF
Filed Jan. 25, 1963

INVENTOR
HU C. MYERS

BY
ATTORNEY

United States Patent Office 3,212,502
Patented Oct. 19, 1965

3,212,502
KNOTLESS ADHESIVE IMPREGNATED SUTURES
AND METHOD OF USE THEREOF
Hu C. Myers, P.O. Box 295, Philippi, W. Va.
Filed Jan. 25, 1963, Ser. No. 253,879
7 Claims. (Cl. 128—335.5)

This invention relates to the care of the bodies of both humans and animals and to the repairing and mending of tissues which have been separated by accident or design The invention relates particularly to a method and apparatus for joining separated tissues and for maintaining such tissues in position during the healing process.

Heretofore, when human or animal tissue has been separated either by accident or during a surgical operation, it has been necessary to join the severed tissues with sutures of catgut or fibrous thread and to tie a knot in each stitch of the susture so that the suture will remain in position and hold the tissue together during the healing process. The internal sutures have been permitted to dissolve and be absorbed by the body. However, the external sutures must be removed by the surgeon or his assistant after approximately 7 to 10 days. These sutures have had a tendency to pull through the tissue and permit the tissue to separate when subjected to slight strains.

In recent years there has been some experimental work done using the chemical methyl 2-cyanoacrylate as a bond for the tissue by coating both surfaces and pressing the surfaces together until the chemical had time to harden. Since the chemical coating retarded the healing process by preventing the tissues from knitting, the experimental work has not proved a success and has been substantially discontinued.

It is an object of the invention to provide a method for applying a suture to human and animal tissue which will maintain the tissues in correct position without the necessity of tying knots in the suture.

Another object of the invention is to provide apparatus for joining separated tissue and maintaining such tissues in assembled relation without knots.

A further object of the invention is to provide a method and apparatus for joining separated tissues which permits the healing process to take place and in which the sutures do not have to be removed.

A still further object of the invention is to provide a suture impregnated with a chemical adhesive and which suture can be applied to the tissue being joined without loss of the chemical adhesive.

Figure 1:
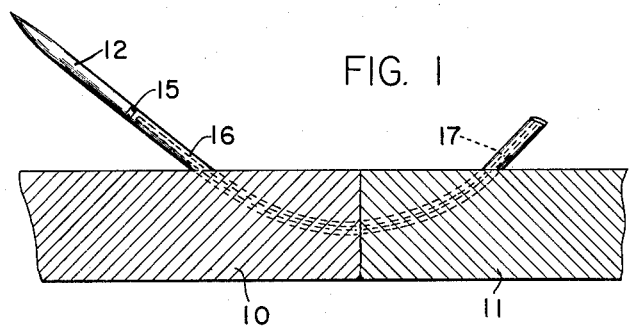
Figure 2:
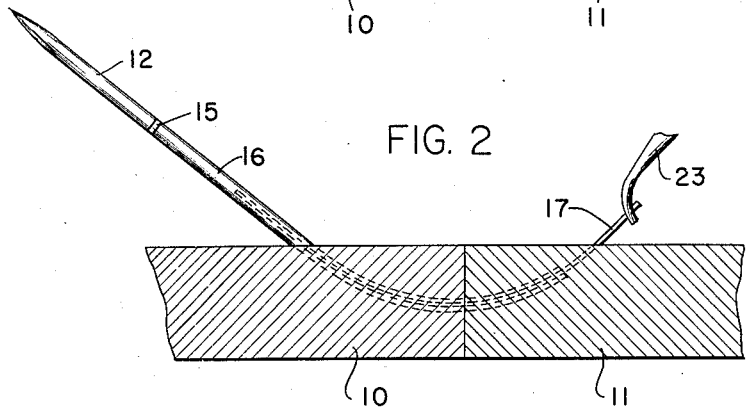
Figure 3:
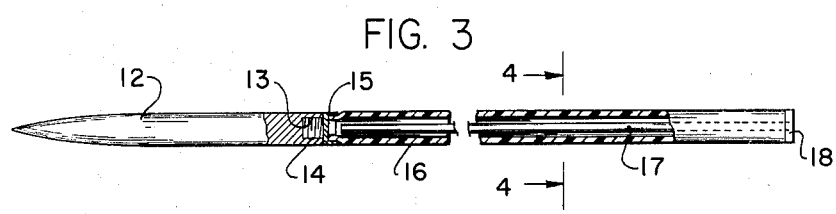
Figure 4:
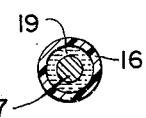

Other objects and advantages of the invention will be apparent from the following description taken in conjunction with the accompanying drawing in which:

FIG. 1 is a side elevation illustrating the first step in the joining of tissue;

FIG. 2, a side elevation of the suture material being removed from the plastic carrier;

FIG. 3, an enlarged side elevation of the apparatus with portions broken away;

FIG. 4, an enlarged vertical section taken along the line 4—4 of FIG. 3; and

Figure 5:
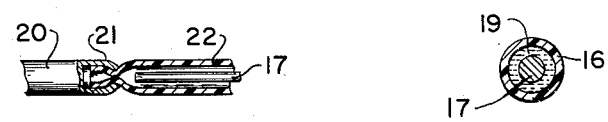

FIG. 5, a fragmentary section of a modified form of the apparatus.

Briefly stated the present invention is a method and apparatus for joining separated tissues of human and animal bodies in a manner to promote the healing process and includes a surgical needle attached to a plastic tube in which suture material impregnated with methyl 2-cyanoacrylate is disposed. The needle and tube are passed through both portions of the tissue being joined after which the free end of the tube is removed, the suture material is held and the plastic tube is withdrawn from the tissue leaving suture material embedded therein.

With continued reference to the drawing, the present invention contemplates the joining of two or more portions of human or animal tissue 10 and 11 in such a manner that the healing process will be encouraged and the portions of tissue will be held in abutting relation without the necessity of tying knots in the suture material.

In order to do this, a surgical needle 12 is provided which may be either straight or curved. The needle has a threaded recess 13 in one end for the reception of a complementary threaded lug or projection 14 mounted on a cap 15. Such cap is attached in sealing relation to one end of a hollow flexible tube 16 of plastic or the like which may be of any desired length and preferably is of a diameter substantially equal to the diameter of the needle. An individual suture 17 of catgut or fibrous thread is introduced into the tube 16 and such tube is then filled with methyl 2-cyanoacrylate 19 or other chemical in liquid form which solidifies rapidly and functions as a bonding adhesive to and is compatible with living tissue. When the suture material 17 has been saturated, the free end of the tube 16 is closed by a heat seal 18 in such a manner that the suture material is fused to the heat sealed end of the plastic tube.

If desired, a disposable needle 20 (FIG. 5) having a recess 21 may be crimped or otherwise swaged to one end of a hollow tube 22 after which the suture material 17 is introduced into the tube and saturated as described above. It is noted that the needles, tubes and sutures may be provided in several sizes so that an appropriate size may be used for different applications. Also the suture material and tube may be connected to either a reusable needle or a disposable needle.

In the use of the device, the portions of tissue, which may include muscles or tendons that have a tendency to constrict when severed, are held firmly together in abutting relation and the needle is inserted in one portion of tissue and removed from the other portion. The passage of the needle will pull the plastic tube through the tissue. After the needle has been removed from the tissue the opposite end of the plastic tube is cut off and the suture material is gripped by a pair of forceps or other clamping device 23 after which the needle is pulled to remove the plastic tube from the tissue. As soon as the tube is removed the chemical begins to solidify to cause the portions of tissue to remain in contact with each other. As soon as the chemical has solidified by exposure in or contact with the tissues the opposite ends of the suture material may be cut off at the point where they protrude from the tissue and such suture material will remain in the tissue until such time as it dissolves and is absorbed. In this manner the healing process is permitted to function normally. Since no knot is required in the suture material the needle may be inserted and removed a substantial distance from the point where the tissue has been severed and will thereby provide greater holding power to maintain the portions of tissue in abutting relation.

It will be obvious to one skilled in the art that various changes may be made in the invention without departing from the spirit and scope thereof and therefore the invention is not limited by that which is illustrated in the drawing and described in the specification, but only as indicated in the accompanying claims.

What is claimed is:

1. Apparatus for joining two or more portions of living tissue comprising a surgical needle, a hollow flexible tube connected at one end to said needle, suture material disposed within said hollow tube, and said suture material being impregnated with methyl 2-cyanoacrylate whereby said needle and said plastic tube may be passed through the portions of tissue to be joined and the suture material may be moved from the plastic tube to form a bond with the tissue to maintain said tissue in abutting relation.

2. The structure of claim 1 in which one end of said hollow tube threadedly engages a recess in said needle.

3. The structure of claim 1 in which said needle is crimped to one end of said hollow tube.

4. Apparatus for joining living tissues comprising a hollow tube, suture material within said hollow tube, means for sealing said hollow tube at both ends, said suture material being impregnated with methyl 2-cyanoacrylate, means for inserting said hollow tube in both portions of said tissue to be joined, whereby when the hollow tube is removed said methyl 2-cyanoacrylate will form a bond between said suture material and the living tissue.

5. Apparatus for joining portions of living tissue comprising a hollow flexible tube, suture material carried within said tube, an adhesive compatible to living tissue impregnating said suture material, means for sealing both ends of said tube, and means for inserting said tube in at least two portions of said living tissue, whereby when said tube is removed said adhesive will unite said suture material and the living tissue.

6. A method of joining abutting surfaces of two or more portions of adjacent living tissue together comprising:
holding the abutting surfaces of the portions of living tissue in intimate contacting relation with each other,
providing elongated suture material saturated with an adhesive having the characteristics of methyl 2-cyanoacrylate and compatible to living tissue,
temporarily maintaining the adhesive-saturated elongated suture material isolated from contact with the portions of living tissue,
bodily placing the isolated adhesive-saturated suture material within the portions of living tissue so as to extend in a direction therein across the abutting surfaces thereof,
releasing the adhesive material and suture material into intimate contacting relation with the portions of living tissue throughout the length of the suture material to thereby tensionally connect and effect a bonding of the latter with the portions of living tissue in contact therewith to permit the natural process of healing between the abutting surfaces of the living tissue to take place in a normal manner.

7. A method of joining abutting surfaces of two or more portions of adjacent living tissue together comprising:
holding the abutting surfaces of the portions of living tissue in aligned intimate contact with each other,
embedding a sealingly isolated suture material saturated with liquified methyl 2-cyanoacrylate within at least adjacent parts of the portions of adjacent living tissue so as to extend across the juncture thereof,
releasing the adhesive material and suture material into intimate contacting relation with the portions of living tissue throughout the length of the embedded suture material to thereby effect solidfication of the adhesive and resulting bonding of the suture material with the portions of living tissue in contact therewith to permit the natural process of healing between the abutting surfaces of the living tissue to take place in a normal manner.

References Cited by the Examiner
UNITED STATES PATENTS

| | | | |
|---|---|---|---|
| 2,707,958 | 5/55 | Davis | 128—349 |
| 2,897,820 | 8/59 | Tauber | 128—340 X |

OTHER REFERENCES

"Suture Needle With Detachable Point," Surgery, vol. 36, No. 4, pp. 790–1.

Fischl: "An Adhesive for Primary Closure of Skin Incisions," from Plastic and Reconstructure Surgery, vol. 30, No. 5, November 1962, pp. 607–610.

Carton et al.: "A Plastic Adhesive Method of Small Blood Vessel Surgery," from World Neurology, vol. 1, 1960, pp. 356–61.

RICHARD A. GAUDET, *Primary Examiner.*

JORDAN FRANKLIN, *Examiner.*